(12) United States Patent
Altmikus (10) Patent No.: US 10,082,129 B2
(45) Date of Patent: Sep. 25, 2018

(54) WIND TURBINE

(71) Applicant: Wobben Properties GmbH, Aurich (DE)

(72) Inventor: Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 336 days.

(21) Appl. No.: 14/649,164

(22) PCT Filed: Nov. 13, 2013

(86) PCT No.: PCT/EP2013/073753
§ 371 (c)(1),
(2) Date: Jun. 2, 2015

(87) PCT Pub. No.: WO2014/086564
PCT Pub. Date: Jun. 12, 2014

(65) Prior Publication Data
US 2015/0300317 A1 Oct. 22, 2015

(30) Foreign Application Priority Data

Dec. 7, 2012 (DE) .......... 10 2012 023 896
Mar. 15, 2013 (DE) .......... 10 2013 204 637

(51) Int. Cl.
*F03D 1/06* (2006.01)
*F03D 13/10* (2016.01)

(52) U.S. Cl.
CPC .......... *F03D 1/0675* (2013.01); *F03D 1/0633* (2013.01); *F03D 13/10* (2016.05); *F05B 2240/30* (2013.01); *F05B 2260/96* (2013.01); *Y02B 10/30* (2013.01); *Y02E 10/721* (2013.01); *Y02P 70/523* (2015.11)

(58) Field of Classification Search
CPC ........ F03D 1/0675; F03D 13/10; F03D 1/065; F03D 1/0633; F05B 2240/30; F05B 2260/96; Y02E 10/721
See application file for complete search history.

(56) References Cited

U.S. PATENT DOCUMENTS

| 2,884,077 | A | * | 4/1959 | Stamm | ........... B64C 27/473 29/889.72 |
| 6,398,502 | B1 | | 6/2002 | Wobben | |
| 7,766,620 | B2 | * | 8/2010 | Stam | ........... F03D 1/0675 416/146 R |
| 7,909,576 | B1 | | 3/2011 | van der Bos et al. | |
| 7,976,275 | B2 | | 7/2011 | Miebach et al. | |

(Continued)

FOREIGN PATENT DOCUMENTS

| CL | 201501561 | 6/2015 |
| CN | 101240771 A | 8/2008 |

(Continued)

Primary Examiner — Logan Kraft
Assistant Examiner — Peter T Hrubiec
(74) Attorney, Agent, or Firm — Seed IP Law Group LLP (57) ABSTRACT

The present invention relates to a method for mounting a rear edge ridge onto a rotor blade of a wind turbine, wherein the rotor blade has a pressure and a suction side and an essentially straight trailing edge. A tongue section projecting to the rear is provided at the trailing edge to form a step each to the pressure side and to the suction side in the area of the tongue section. The rear edge ridge or part thereof is then fitted onto the tongue section, so that it is flush with the suction side or pressure side, respectively, in the area of the step.

6 Claims, 5 Drawing Sheets

(56) References Cited

U.S. PATENT DOCUMENTS

| | | | |
|---|---|---|---|
| 9,086,054 B2 | 7/2015 | Loh et al. | |
| 2008/0187442 A1 | 8/2008 | Standish et al. | |
| 2011/0142666 A1 | 6/2011 | Drobietz et al. | |
| 2011/0142668 A1 | 6/2011 | Rao | |
| 2013/0272892 A1* | 10/2013 | Liu | F03D 1/0675 416/225 |
| 2015/0377210 A1* | 12/2015 | Bech | B24B 9/20 416/230 |

FOREIGN PATENT DOCUMENTS

| | | |
|---|---|---|
| DE | 196 47 102 A1 | 5/1998 |
| DE | 10 2008 007 908 A1 | 8/2008 |
| DE | 10 2011 051 329 A1 | 12/2011 |
| DE | 10 2011 052 934 A1 | 3/2012 |
| EP | 0 652 367 A1 | 5/1995 |
| EP | 0 653 367 A1 | 5/1995 |
| EP | 1 019 632 B1 | 7/2002 |
| EP | 1 338 793 A2 | 8/2003 |
| EP | 1 314 885 B1 | 8/2007 |
| EP | 2475874 A | 8/2016 |
| JP | 2003336572 A | 11/2003 |
| RU | 2013616 C1 | 5/1994 |
| RU | 2309290 C1 | 10/2007 |
| WO | 99/18352 A1 | 4/1999 |
| WO | 2011/157849 A2 | 12/2011 |
| WO | 2012/019655 A1 | 2/2012 |

* cited by examiner

WIND TURBINE

BACKGROUND

Technical Field

The present invention relates to the design of the rear edge of a rotor blade of a wind turbine. The present invention furthermore relates to a spike-shaped rear edge, also referred to as rear edge ridge. The present invention moreover relates to a wind turbine rotor blade and method for mounting a rear edge ridge to a rotor blade. The present invention moreover relates to a wind turbine with rotor blades having at least one rear edge ridge.

Description of the Related Art

From EP 0 653 367 A1 we know that the rear edge should be saw-tooth shaped in a longitudinal direction of the main spar of the rotor blade, in order to reduce the noise level.

From EP 1 019 632 we know that the degree of tapering of the rotor blade in a transverse direction of the main spar of the rotor blade increases with increasing approximation to the rear edge, again in order to reduce the noise level.

From EP 1 314 885 B1 we know that the rear edge should be saw-tooth shaped in a longitudinal direction of the main spar of the rotor blade and, at the same time, flexible, in order to increase the torque that the rotor blade exerts on the generator.

From European patent application EP 0 652 367 A1 we know to provide a saw-toothed rear edge at a rotor blade, which is, for example, fixed onto a chamfered part of the rotor blade as a saw-tooth shaped strip 9.

As a matter of fact, practically no wind turbines with rotors blades with spike-shaped rear edges have been installed so far, although for example Document EP 0 652 367 stems from the year 1994. One reason might be that it is difficult to realize this in practice. The problems that need to be considered are associated, in particular, with costs, quality and durability. Also, it may be problematic to retrofit the rear edge ridges of rotor blades of already installed turbines or, at least, of already existing rotor blades.

BRIEF SUMMARY

One or more embodiments of the present invention may address at least one of the problems mentioned above. One embodiment of the invention is to facilitate the installation of a saw-tooth shaped rear edge. It shall, at least, propose an alternative embodiment.

In accordance with one embodiment of the invention, a method for mounting a rear edge ridge to a rotor blade of a wind turbine is provided. The rotor blade features a pressure side and a suction side as well as an essentially straight trailing edge. Such trailing edge may be slightly bent or curved across the entire length of the rotor blade, but is to be seen as a straight line in relation to the spike-shaped form of the rear edge ridge that is to be mounted. Here, a rear edge ridge means a spike-shaped rotor blade rear edge, wherein the spikes are in particular narrow, with each spike having a pointed angle at its tip, i.e., an angle of less than 90°, in particular significantly less than 90°. Accordingly, two adjacent spikes will be at such a low, pointed angle to each other.

Initially, a tongue section projecting to the rear is provided at the trailing edge of the rotor blade, meaning that in the area of such tongue section a step is formed on the pressure side and on the suction side, at the respective surfaces of the pressure and/or suction side. In this respect, the trailing edge means a rear edge, namely in relation to the intended movement of the rotor blade and also in relation to the airflows during operation of the wind turbine, that run from the leading edge to the rear edge. The term trailing edge is used to avoid any confusion with the rear edge ridge that is to be mounted; the latter may also be referred to as spike-shaped rear edge.

In a next step, the rear edge ridge or part thereof is fit onto the tongue section, so that it is flush with the suction side or pressure side, respectively, in the area of the step. Preferably, the rear edge ridge may be subdivided into several sections, so that only part of the rear edge ridge is mounted in each case.

This embodiment allows for the rear edge ridge to be mounted firmly and in a well-aligned manner to the trailing edge of the rotor blade. The fact that the rear edge sits on the tongue with a corresponding groove, allows for great tilt stability. The provision of said tongue that is adapted to the rear edge ridge that is to be mounted defines the orientation of the mounted rear edge ridge. This way, it can be ensured that even such mounted rear edge ridge is aligned to the mean outflow direction at the local section that is to be expected during operation and that follows from the coinciding of the boundary layer flow on the suction and pressure side.

This means that a disruption of the airflow is avoided in any event, and in particular, in the area where the rear edge ridge is mounted. This is also supported by the flush arrangement in the area of the step. The surface of the rotor blade's suction side can thus move to the respective side of the rear edge ridge without any step or similar obstacle. The same is true for the surface of the suction side to the respective side of the rear edge ridge.

One possible solution to the problem is thus to mount the saw-tooth shaped rear edge to the rotor blade as a separate part. The cross profile of the saw-tooth shaped rear edge in a direction of the main spar is preferably funnel-shaped and can thus be mounted onto the stepped rear edge, being the former rear edge of the rotor blade.

According to one embodiment, it is proposed for the tongue section, which projects to the rear, to be provided by removing one material strip each from the suction side and from the pressure side in the area of the straight trailing edge, in particular by means of milling with a router. What is thus taken as a basis is a finished rotor blade, or a rotor blade can be produced in a familiar way without providing for a rear edge ridge or without providing for a respective housing for a rear edge ridge, respectively. With such a rotor blade that is basically finished, but where some final work, such as for example painting, has not been performed yet, a tongue section is then provided at the rotor blade edge through material removal. For this work, one may use, in particular, a router that sets a specific distance between the existing edge and the step to be provided and then removes the material accordingly. This can be done for either side—i.e., for the suction side and for the pressure side—, in particular with identical depth such as 2 mm, to thus create the desired tongue distance.

According to one alternative, it is proposed for a form for production of the rotor blade to provide for a complementary step that is adapted to the step, in particular by providing for an insertion element with such complementary step form. The rotor blade is thus produced in at least one form, namely in a rotor blade form. It features a cast of the yet-to-be-produced rotor blade or yet-to-be-produced part of the rotor blade. The form is then modified in the area where the tongue is to be formed—i.e., in the area where the trailing edge of the rotor blade is produced and formed—in such a way that the tongue or part thereof is directly formed as well.

According to one embodiment, the rotor blade is produced from two parts, such as two halves, one of which forms essentially the suction side and the other essentially the pressure side of the rotor blade. The two parts are then put combined and connected to each other. Two forms are provided, namely one for each part of the rotor blade, and two insertion elements are provided, namely one for each form. Such an insertion element may be formed, for example, as a block with a rectangular cross-section of 50 mm×2 mm, preferably as a wax block. It is flexible and can be adjusted to the contour of the rotor blade form.

According to one embodiment, the rear edge ridge is formed as a profile and has a groove section and an end section. The groove section is mounted onto the tongue section of the rotor blade. The groove section therefore features a recess, namely a groove, that is adjusted to the tongue section, in particular in terms of thickness and depth. Accordingly, the groove is designed reciprocally or complementary to the tongue, respectively, and/or is slightly wider than the tongue is thick to provide enough space for adhesive, such as adhesive resin. The groove is, in particular, at least 0.5 mm, at least 1 mm or at least 2 mm thicker than the tongue of the tongue section.

The end section is facing away from the groove section, and the rear edge ridge flattens out in a spike-shaped manner towards the end section. This way, the rear edge ridge can be firmly affixed to the rotor blade, and the rear edge ridge can, at the same time, provide an as thin as possible rear edge featuring expedient spikes.

Preferably, it is proposed to split the rear edge ridge into several sections and to affix the sections to the rotor blade one after another. By using several sections, it will be easier to handle the rear edge ridge to be mounted, which may be more than 10 m long or even many times longer. By splitting the rear edge ridge into long sections, for example into four sections of approximately same length, one can still ensure a uniform—possibly even continuous—area, and thus a continuous spike-shaped rear edge at the rotor blade.

Another embodiment breaks down the sections, that run towards the rotor blade's tip, into smaller lengths, in order to better follow the stronger curve of the rotor blade's trailing edge towards the rotor blade's tip.

In yet another embodiment, already the design of the definition of the rear edge ridge or of the latter's spike formation (also referred to as serration), respectively, does not follow an anticipated straight course of the rotor blade's trailing edge, but instead follows directly the actual pre-curvature of the trailing edge of the rotor blade according to the design, so that sections of the same length may be used here effectively to reduce the amount of work required for assembly.

Uniform installation and thus an altogether evenly assembled rear edge ridge can be achieved, in particular, thanks to the proposed fixing of the rear edge ridge to a corresponding tongue or to a corresponding tongue section, respectively.

It is preferably proposed to apply an adhesive, in particular an adhesive resin, on the tongue section and/or to apply such adhesive in the groove section before mounting the rear edge ridge onto the tongue section. This will ensure a bond by means of adhesive and avoid the use of other fastenings, such as screws and bolts, to allow for an even spread of force in the connection area between the trailing edge of the rotor blade and the rear edge ridge. This will also prevent adverse effects on the surface of the rear edge ridge that may be caused by bolts or other fastenings. The selected adhesive is preferably used to fill any remaining gaps, in particular tiny gaps, between rear edge ridge and rotor blade in the area of the step, and to thus achieve an as smooth as possible transition from the surface of the suction and/or pressure side to the respective surface area of the rear edge ridge. One may, however, also consider additional protection by means of fastenings, such as rivets, screws and bolts.

The adhesive, in particular the adhesive resin, is preferably adapted to the material of the rotor blade and/or of the rear edge ridge. The rotor blade may consist, in particular, of a fiberglass-reinforced plastic material comprising a synthetic resin, and, preferably, the very same synthetic resin or a synthetic resin adapted thereto is used as adhesive resin.

A second, alternative solution to the problem is to directly cut out the saw-tooth shaped rear edge from the rear laminate layers of the rotor blade by applying a suitable cutting technique. To this end, the rear laminate layers of the rotor blade are led out in the direction of the rear edge, which then quasi frazzle towards the rear edge. The preferred cutting technique is a computer- and robot-controlled cutting technique, such as water jet cutting or laser beam cutting.

The method according to at least one of the above embodiments can be deemed comparably complex. It has been realized, however, that good results may be achieved, because a good transition from the blade end, i.e., from the trailing edge of the rotor blade, to the rear edge ridge, and thus to the rear edge, can be created. It has been realized, in particular, that the advantages of such a rear edge ridge, i.e., of a spike-shaped rear edge, can be fully exploited only if the mounting is expedient. What is avoided, in particular, is that an adverse mounting, especially a bad transition from the rotor blade, i.e., from the main element of the rotor blade to the rear edge ridge will undue, in whole or in part, the advantages of the rear edge ridge.

What is moreover proposed in accordance with one embodiment of the invention is a method that is directed, in particular, at the retrofitting of an existing rotor blade having a fitted rear edge, namely a straight, i.e., spikeless, fitted rear edge that is designed as a profile. Here, a fitted rear edge is assumed having a fastening section, with which such straight rear edge is applied to the rotor blade in the area of a trailing edge. Such rear edge has also an end section that faces away from such fastening section and towards which the profile flattens out. Such end section thus points to the rear in relation to an envisaged movement of the rotor blade—i.e., it points to the direction in which air passes the rotor blade when in operation.

What is moreover assumed is a rear edge that is arranged between the fastening section and the end section, having a cavity between the suction side and the pressure side of the rear edge.

What is now proposed for a rotor blade having such a rear edge, is to retrofit the rotor blade with a rear edge ridge that is designed as a flat component. Thus, such rear edge ridge has, in essence, a homogeneous thickness and may—pursuant to yet another advantageous embodiment—taper towards the rear edge. The spikes of the rear edge ridge may possibly, in addition, flatten out towards their tips by applying to the pressure side—in case of finite thickness—a chamfer with an angle of $\alpha$. Several spikes are referred to as spike section, and these several spikes are connected to each other via a base section of the rear edge ridge. It is proposed for the base section, at any rate, to be preferably evenly flat, in essence.

The method now proposes in this context to cut open the fitted rear edge in the area of its intermediate section, and to thus open the cavity. The base section of the rear edge ridge is then inserted into the thus opened cavity between upper side and lower side. The rear edge ridge could be thus complemented. The bond between rear edge and inserted rear edge ridge can be possibly enhanced or secured by means of adhesive. The rear edge is preferably made of PVC, and the adhesive to be used is adapted to such PVC. Preferably, it is also adapted to the rear edge ridge, which may be preferably made of fiberglass-reinforced plastic material.

According to one embodiment, it is proposed to cut open the fitted rear edge lengthwise such as to cut off the end section and/or an end strip with predefined width in the area of the end section. This way, the tip of the profile is, in relation to a cross-section of the profile, cut off lengthwise such that the cavity is opened across the entire envisaged line or length. If the dimensions are known, i.e., if the geometry of the fitted rear edge is known—which is normally the case—, the cutting off of an end strip with predefined width will result in a uniform opening, namely in a roughly uniform slot leading to the cavity of the intermediate section. What is moreover achieved is that the cavity has roughly the same depth in a longitudinal direction, from the slot to the end of the cavity. Hence, the rear edge ridge can be easily inserted into the thus opened cavity and is thus placed likewise evenly in this cavity and applied to the rotor blade.

By providing for adhesive that is preferably placed in the cavity before the rear edge ridge is inserted into this cavity, one can achieve a firm bond and also a firm fit. To achieve a transition from the fitted rear edge to the inserted rear edge ridge, namely to the spike section of the rear edge ridge projecting to the rear, the rear edge is chamfered in its cut off area. This results in two chamfered areas or walls of the fitted rear edge, which house the rear edge ridge between them, like tongs.

The provision of such a sloped or chamfered area is achieved directly during or by the cut-off process, or it is achieved in a separate step.

Preferably, the cavity that has been opened by cutting may become wider towards its opening for insertion of the rear edge ridge; it may be, in particular, chamfered in V-shape from the inside. This will not only make it easier to insert the rear edge ridge, but the opening that has been created can be also adapted to the thickness of the rear edge ridge, especially in the area of its base section. This will prevent the fitted rear edge from widening too much, and this will also prevent the fitted rear edge from forming a bent surface in this area. By chamfering the cavity towards its opening, in particular in a V-shape, one can positively influence the adhesive properties of the adhesive of the thus altered rear edge.

What is moreover proposed in accordance with one embodiment of the invention is a rotor blade of a wind turbine that features a rear edge ridge, a pressure side, a suction side and a trailing edge. The trailing edge is essentially facing away from the rotor blade's intended direction of movement. The rotor blade features a tongue section in the area of the trailing edge, and the rear edge ridge is mounted onto the tongue section. The rear edge ridge is preferably glued to the tongue section, in particular by means of an adhesive resin. Also, or as an alternative, there is an step between one surface of the rotor blade and one side of the tongue section, and the rear edge ridge is mounted onto the tongue such as to be flush with the surface at the step. If necessary, any remaining, narrow gaps or cracks can be filled and/or sealed with appropriate material. Preferably, one will use adhesive, in particular adhesive resin to this end. The rear edge ridge is preferably made of fiber-reinforced material, in particular of fiberglass-reinforced plastic material and in particular of the same material as the rotor blade, at any rate as the better part of the rotor blade and/or as the rotor blade in the area of its trailing edge. This will bring about a lasting bond between rotor blade and rear edge ridge, which will remain solid and strong even over a large temperature range, because the use of the same materials is likely to result in the same thermal expansion. This is yet another reason why it is advantageous to use an adhesive resin that has properties similar to those of the material of the rotor blade and/or of the rear edge ridge, that can be easily bonded with the material of the rotor blade and/or of the rear edge ridge and that is preferably already contained in the material of the rotor blade and/or in the material of the rear edge ridge.

Preferably, the rotor blade has a rear edge ridge that has been affixed by a method pursuant to one of the above-described embodiments.

What is moreover proposed in accordance with one embodiment of the invention is a rear edge ridge for use with a rotor blade according to one of the embodiments, and it is also, or alternatively, prepared to be affixed to a rotor blade by means of a method as described hereinabove in connection with at least one of the embodiments. The rear edge ridge is in particular prepared insofar as it features the configurations described in respect of the respective embodiments, whether rotor blade or the method of fitting.

Preferably, the rear edge ridge has a spike length that is about 3 to 5 times, in particular 4 times the size of the distance between two adjacent spikes. This means that one spike of the rear edge ridge is 3 to 5 times or 4 times, respectively, the length of its distance to an adjacent spike. Here, the distance between the tips of the spikes is taken as a basis.

What is moreover proposed is a wind turbine having a rotor blade according to at least one of the above-described embodiments and/or having a rear edge ridge according to at least one of the above-described embodiments.

Preferably, the rear edge ridge is made of fiberglass-reinforced plastic material and has the following characteristics:

E modulus=8000-12000 N/mm$^2$

Fiber volume fraction $\Phi$=0.40-0.45

Occupancy: Short fiber reinforced or +/−45° multi-ply weave

Matrix: preferably EP Epoxy

Temperature-resistant up to −40° C.

BRIEF DESCRIPTION OF THE SEVERAL VIEWS OF THE DRAWINGS

The invention is described in more detail below by embodiments as examples with reference to the accompanying figures.

DETAILED DESCRIPTION

Figure 1:
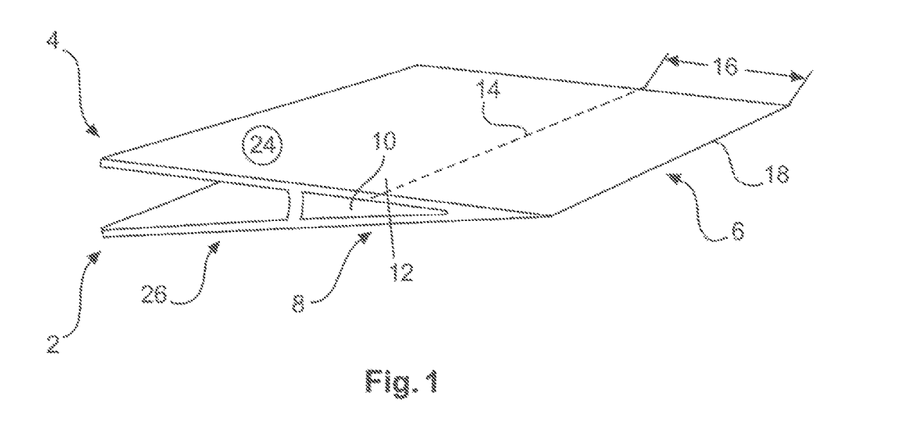
FIG. 1 shows a slip-on or fitted rear edge.

FIG. 1 shows a slip-on rear edge. If necessary, a saw-tooth shaped contour can be cut out of the pointed course of the rear edge by applying an appropriate cutting technique. In this context, it is proposed to first fill—in particular to fill with foam—an affected cavity at the rear edge, and to then cut the desired contour into the filling or foam, once the filling or foam has cured. The preferred cutting technique is a computer- and robot-controlled cutting technique, such as water jet cutting or laser beam cutting.

FIG. 1 shows a slip-on or put-on rear edge 2 having a fastening section 4 and an end section 6. An intermediate section 8 having a cavity 10 exists between fastening section 4 and end section 6. Such rear edge 2 may be arranged at a trailing edge of a rotor blade. In order to now add a rear edge ridge to such rotor blade, it is proposed to cut off the end section 6 at a suggested interface 12. A designated trim line 14 is shown as a dashed line. The trim distance 16 between trim line 14 and one trailing edge 18 of the rear edge must be kept uniformly.

Figure 2:
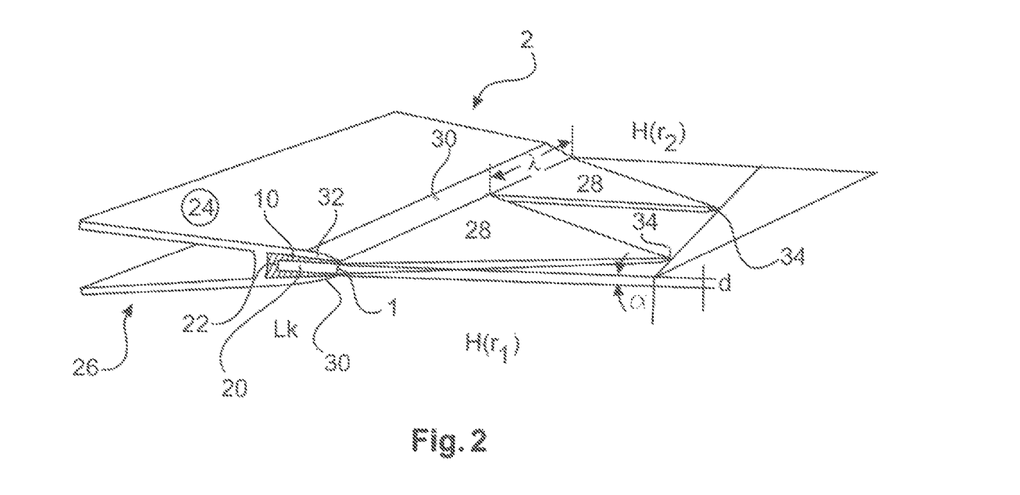
FIG. 2 shows a slip-on or fitted rear edge having an additionally fitted saw-tooth shaped contour, namely a fitted or inserted rear edge ridge.

FIG. 2 thus shows a slip-on rear edge having an additionally mounted saw-tooth shaped contour. The slip-on rear edge has a groove in its pointed area, onto which the further part of a saw-tooth shaped contour can be mounted. Such configuration of a rear edge has the advantage that an initially straight rear edge—as, for example, according to FIG. 1—can be easily retrofitted with various slip-on saw-tooth shaped contours. To this end, only the rear part of the rear edge must be cut off lengthwise in the direction of the main spar, as shown in FIG. 1, by applying an appropriate cutting technique, such as to form the groove shown in FIG. 2, into which the further part of a saw-tooth shaped contour can be mounted.

Thus, FIG. 2 shows the cut-off condition of rear edge 2, if—as illustrated in FIG. 1—end section 6 is cut off along trim line 14 that is shown therein. This leads to the opening up of cavity 10, which allows for the insertion of a rear edge ridge 1. Cavity 10, only part of which is now left in FIG. 2, wherein reference number 10 has been kept for this cavity in order to simplify explanations, thus houses a base section 20 of rear edge ridge 1. Moreover, an adhesive 22 is shown in cavity 10, which thus secures the rear edge ridge within the opened cavity 10.

Moreover, rear edge 2 has a suction side 24 and a pressure side 26. Rear edge ridge 1 also has various spikes 28 pointing to the rear, namely to the right according to FIG. 2, two of which are shown in FIG. 2. A chamfer 30 is moreover provided both at suction side 24 and at pressure side 26 to allow for an aerodynamically favorable transition from suction side 24 or pressure side 26, respectively, of rear edge 2 to the inserted rear edge ridge 1. What is also provided in the vicinity of such chamfers in cavity 10 is putty paste 32, in order to achieve an advantageous hold for the inserted rear edge ridge 1 or to, possibly, close any gaps.

Rear edge ridge 1 is preferably made of, in particular cut from, a fiber composite panel of uniform or variable thickness d. The depth, i.e., the distance between the tip of one spike 34 and cavity 10, in particular bonded joint 22, is also almost uniform. Such depth may, however, gradually change along the length of the rotor, which will result in different depths. But the depth of two adjacent spikes is almost uniform.

Spikes 28 may, however, flatten towards the end, which is indicated by the angle α. The ratio of spike height H to spike width λ is preferably about 4, which means that the length of each and every spike is about four times its width. FIG. 2 shows two heights H for different radius positions at the pertinent rotor blade, namely radii $r_1$ and $r_2$.

The following procedure is applied to design the thickness of the semifinished product, from which the rear edge spikes are cut. A two-dimensional flow simulation for the designed operating condition of the blade is performed for a representative section of the radial rotor blade area, in which rear edge spikes are affixed. The aerodynamic parameters, namely effective blade angle, freestream Mach number and Reynolds number, are specified for this operating condition and location and calculated based on the simulation of the pressure curve around the profile. A distributed load $q(H_0)$ is determined based on the pressure difference $\Delta p$ between pressure and suction side at 95% of the profile depth, which equals the left-hand start value of a distributed load on the rear edge ridge of width b, which distributed load decreases linearly to zero:

$$q(h_0) \cdot b = \Delta p$$

Such distributed load is applied as load to a cantilever that is fixed on the left-hand side and has a rectangular cross-section and length H, in order to determine function f for deflection based on the linear theory:

$$f = \frac{q(H_0) \cdot H^4}{30 EI}$$

Such cantilever model corresponds to the each individual spike. The rectangular cross-section has the following area moment of inertia:

$$I = \frac{b \cdot d^3}{12}$$

with thickness d and width b. E describes the E modulus of the selected material. If these formulas are combined and solved for the missing thickness of the semifinished product d, i.e., for material thickness, the following result is obtained:

$$d = \sqrt[3]{\frac{2 \cdot \Delta p \cdot H^4}{5 \cdot E \cdot f}}$$

The objective of the design is to obtain an as rigid as possible design for the rear edge ridge. A preferred embodiment requires 0.1 mm for the longest spike of the rear edge ridge for maximum deflection f of the free-standing end of the respective spike. However, if the design is more flexible, then deflection f should not exceed 1 mm.

If one applies $\Delta p=11$ N/m$^2$, spike length H=0.3 m, E=10000 N/mm2 and f=0.1 mm in a preferred embodiment, the resulting thickness d is about 3 mm. All in all, the thickness of the semifinished product should not exceed 5 mm.

Since the spikes have a triangular shape, the air load decreases to zero towards the tip. Therefore, the thickness of the semifinished product may also decrease to zero. For reasons of better manageability, thickness d should not be less than 1 mm at the end of a spike. In case of a fiber composite design, the material is scarfed by starting at the longest central position and then going symmetrically outwards, i.e., the triangular cross-section is approximated starting from the fixing point with decreasing layer widths. Extrusion profiles acquire this cross-section by the matrix used.

Figure 7:
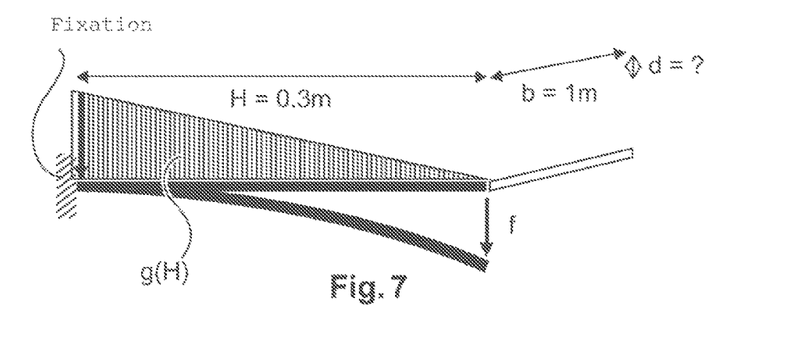
FIG. 7 shows the lateral view of a rear edge spike.

The dimensions used are also shown in FIG. 7, which thus explains this estimate calculation. The selected width b is 1 m. This value is, however, canceled out again during calculation and therefor may be a random value.

Figure 3:
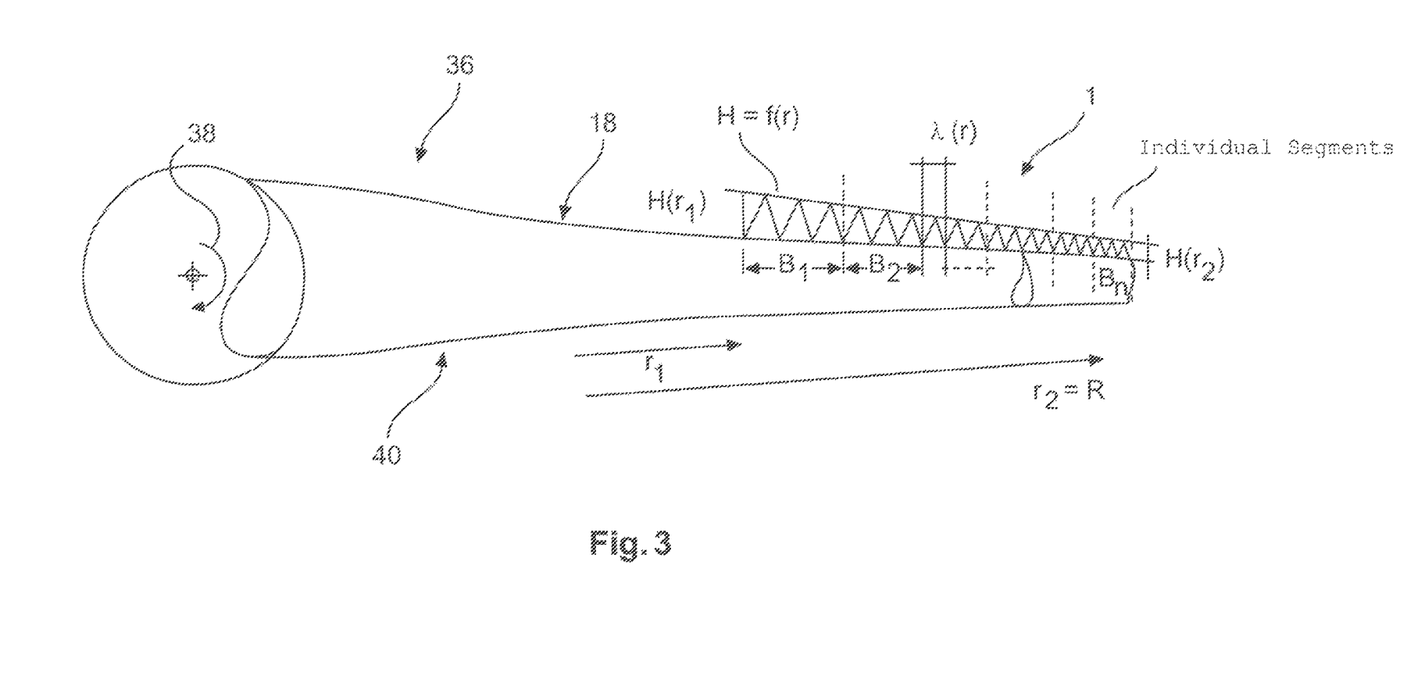
FIG. 3 shows a rotor blade with a rear edge ridge.

FIG. 3 shows the perspective view of a rotor blade 36, for which an intended rotation direction 38 is sketched in. Rotor blade 36 thus has a leading edge 40 and a rear edge or trailing edge 18, respectively. At trailing edge 18 or in the area of trailing edge 18, respectively, it is shown that a rear edge ridge 1, the details of which may however differ from the rear edge ridge 1 in FIG. 2, is subdivided into six segments having the width $B_1$, $B_2$ to $B_n$. Height H follows as a function of the actual radius position at the rotor blade, here indicated exemplary as $r_1$ and $r_2$, namely as a function of radius r:

$$H=f(r).$$

What follows moreover is a width λ, which is a function of radius r:

$$\lambda=f(r).$$

Rear edge ridge 1 may thus be used in segments for any width B, and such segments may differ in terms of their width and/or in terms of the height H of the individual spikes. In the above examples, radius $r_2$ equals the maximum radius R of the rotor blade.

Figure 4:
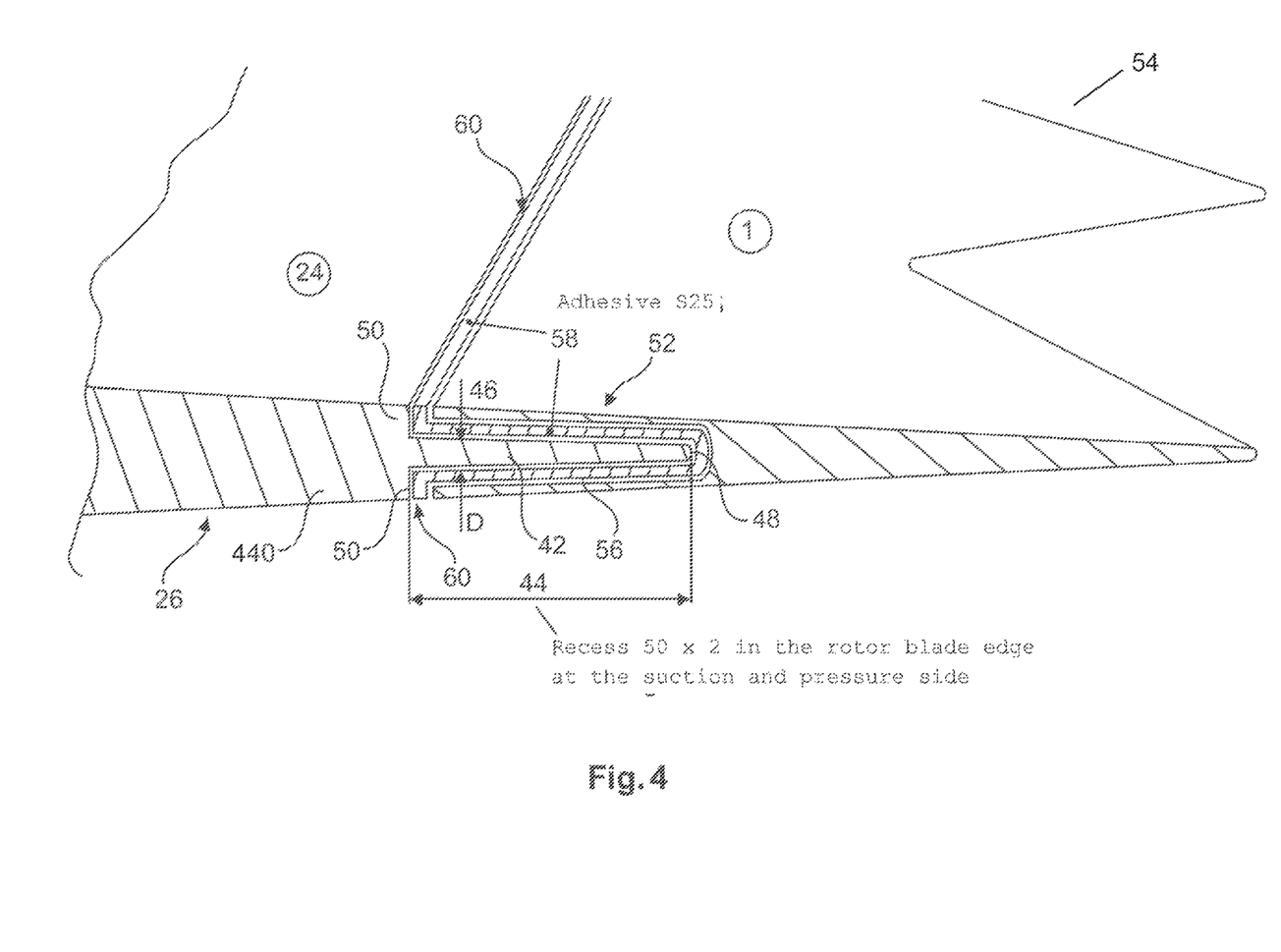
FIG. 4 shows the sectional view of a section of a rotor blade with rear edge ridge.

FIG. 4 shows a different way of how to connect a rear edge ridge 1 and it also shows a different rear edge ridge 1 than FIG. 2, wherein the same reference number has been kept for easier comparison. Some other reference numbers have been kept as well, and a person skilled in the art will know right away that although these are not identical elements, they are nonetheless similar in terms of their function.

FIG. 4 shows that, in the area of a rotor blade edge 440, material was milled off in two strips such as to create a tongue section or bridge section 42, or such that a tongue section 42 remains, respectively. Tongue section 42 can also be created otherwise, however.

Tongue section 42 has a length 44, which is also referred to as recess. Tongue section 42 has a thickness D, which is also marked with reference number 46 for easier reference and which decrease slightly from trailing edge 440 towards tongue edge 48, namely by almost 50%, as shown in the example.

FIG. 4 also shows that the provision of such tongue section 42 forms an step 50 both towards suction side 24 and towards pressure side 26. Here, length 44 of tongue section 42 is the distance between step 50 and tongue edge 48. According to one example, length 44 of tongue section 42 is around 50 mm and has an average thickness D of 2 mm. The mounted rear edge ridge 1 has a groove section 52 and an end section 54. Rear edge ridge 1 flattens from groove section 52 towards end section 54.

Groove section 52 has a groove 56, with which it is mounted onto tongue section 42. Groove 56 is essentially adapted to tongue section 42; it is, in particular, designed reciprocally or complementary in relation thereto. The groove is slightly bigger than the inserted tongue section 42, leaving enough space for adhesive 58. Adhesive 58 also fills a gap 60 between rear edge ridge 1 and step 50, namely a gap towards suction side 24 or towards pressure side 26, respectively. Adhesive 58 can thus glue tight and therefore secure rear edge ridge 1, which is mounted onto tongue section 42. It can also close the two gaps 60 to produce a smooth transition between suction side 24 or pressure side 26, respectively, and the rear edge ridge.

Figure 5:
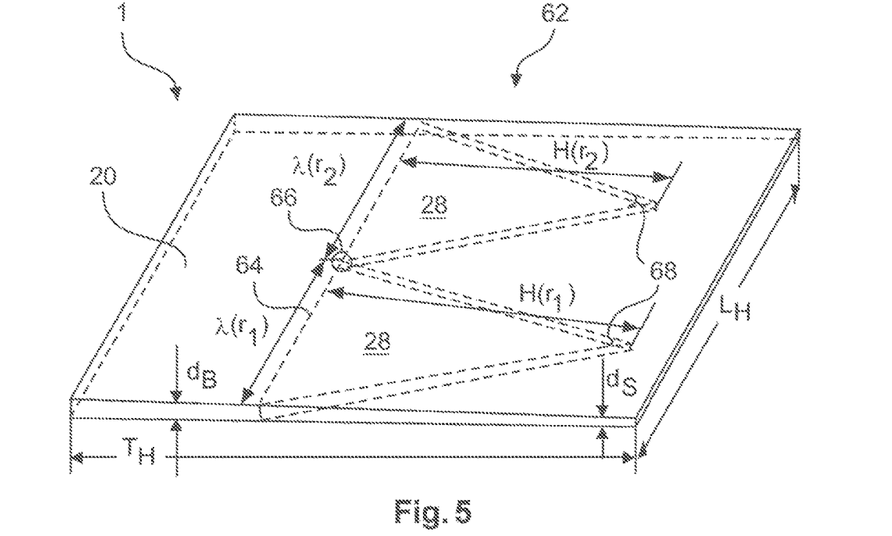
FIG. 5 shows the schematic view of a semifinished product for production of a rear edge ridge.

FIG. 5 shows the schematic view of a semifinished product 62 for production of a rear edge ridge. Such semifinished product may feature, for example, a semifinished product depth $T_H$ of 0.3 m and a semifinished product length $L_H$ of 1 m. FIG. 5 is thus merely an illustration, which describes the semifinished product 62 used for production of a rear edge ridge 1 only for a rear edge ridge or a rear edge ridge section with two spikes 28, respectively. What is normally produced from semifinished product 62 is a rear edge ridge 1 with clearly more spikes 28, for example 20 spikes 28. The explanation based on FIG. 5 can also be applied to rear edge ridges having numerous rear edge spikes 28.

Semifinished product 62 may be made, for example, of a fiberglass-reinforced material. A rear edge ridge 1 with a base section 20 and spikes 28 is cut from such semifinished product 62, for example by means of a water jet cutting technique or the like. Semifinished product 62 has a plate thickness $d_B$ in the area of the to-be-produced base section 20, and it has a tip thickness $d_S$ as a second thickness $d_S'$ at a far side in the area of the tips of the to-be-produced spikes 28. The thickness of the semifinished product may decrease from base thickness $d_B$ to tip thickness $d_S$. According to a preferred embodiment, the thickness of 3 mm in base thickness $d_B$ decreases to 1 mm in tip thickness $d_S$.

Preferably, the thickness will remain steady in a longitudinal direction, i.e., along semifinished product length $L_H$.

The rear edge ridge to be produced, in particular cut, from such semifinished product 62 is shown as a dashed line in the area of its spikes 28. The two spikes 28 may have different heights H, as indicated in FIG. 5. The one spike has a height H(r1) and the other spike has a height H(r2) in relation to a spike base line 64, which is a pure reference line that is shown as a dotted line in FIG. 5. Radius r1 and/or r2 relates to a radius of the aerodynamic rotor of the wind turbine for the intended position of the rear edge ridge that is to be produced. Width λ(r1) or λ(r2), respectively, preferably depends on radius r1 or r2, respectively, of the rotor. The height H to width λ ratio of the respective spike 28 is preferably around 4.

FIG. 5 also shows a baseline bore hole 66, which is proposed to prevent the base section 20 from tearing in this area, namely by the to-be-provided cutting out of spikes 28. Preferably, such baseline bore hole 66 is to be provided on spike base line 64 between each and every spike 28.

In addition, a spike arch 68 is indicated for spikes 28. The use of semifinished product 62 with decreasing thickness will thus also result in the thickness of each and every spike 28 decreasing from the spike base line 64 to spike arch 68.

Figure 6:
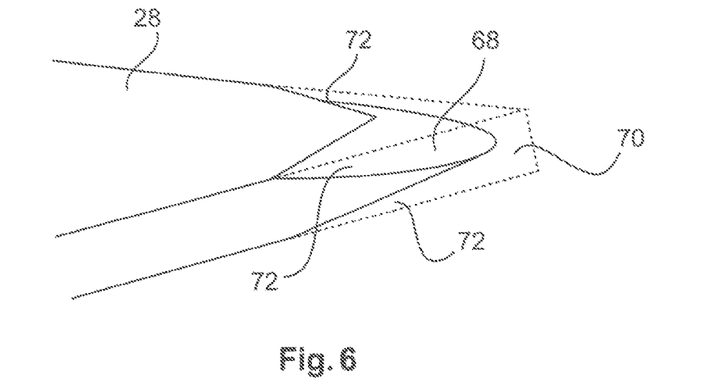
FIG. 6 shows the schematic view of a tip of a rear edge ridge.

FIG. 6 shows an enlarged view of the tip of a spike 28 in the area of a spike arch 68. A former spike tip 70 is indicated in form of a dashed line; it was basically removed and also topped off by the provision of some chamfers 72 to produce the spike arch 68, as shown. It is also possible and advantageous to provide such chamfers 72 at the entire spike 28 all the way to the respective base section 20; however, this requires a lot of work, and the provision of one chamfer only in the area of spike tip 70 is a solution that will bring about good, in particular aerodynamic properties at reasonable effort and expense.

Figure 8:
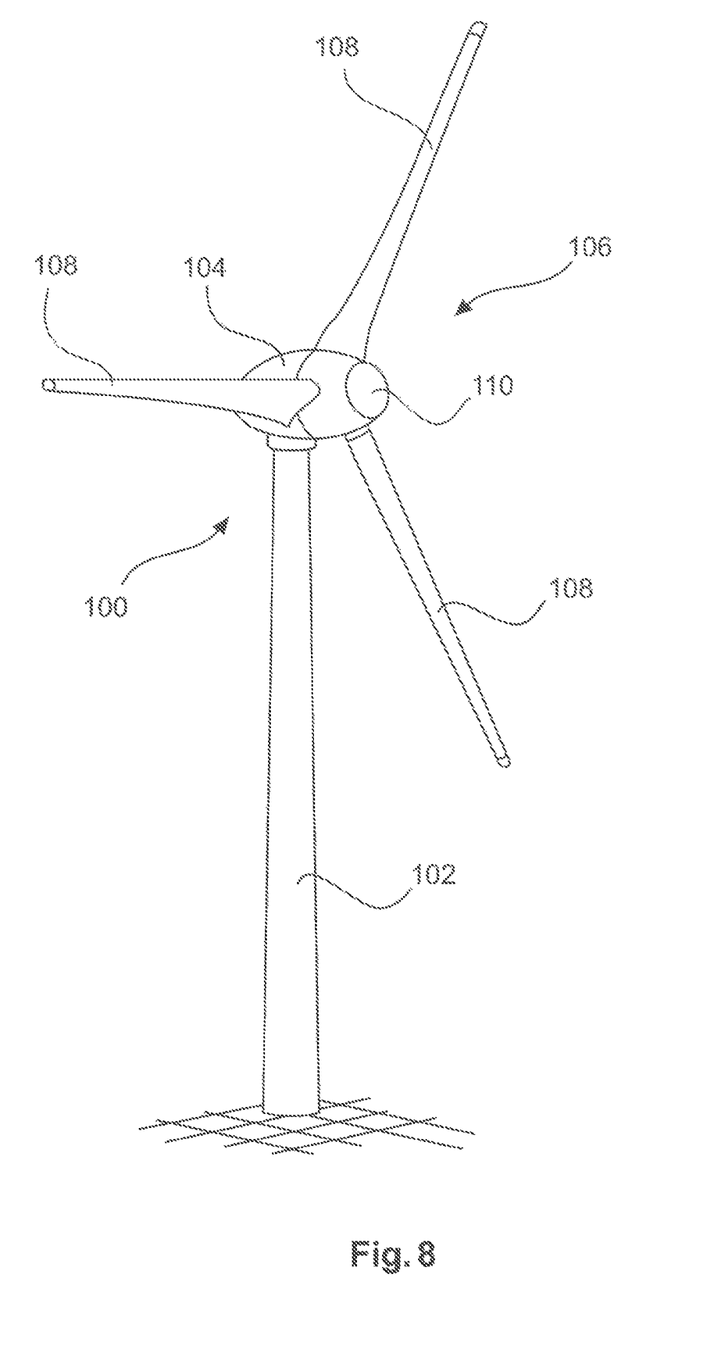
FIG. 8 shows the perspective view of a wind turbine.

FIG. 8 shows a wind turbine 100 with a tower 102 and a nacelle 104. A rotor 106 with three rotor blades 108 and a spinner 110 is arranged on the nacelle 104. The rotor 106 is set in operation by the wind in a rotating movement and thereby drives a generator in the nacelle 104. The illustration shows the schematic view of a wind turbine underlying the present invention as well, where—however—one rear edge ridge at the wind turbine is not shown for reasons of simplification.

The invention claimed is:

1. A method for mounting a rear edge ridge onto a rotor blade of a wind turbine, wherein the rotor blade has a pressure side and a suction side and a trailing edge, the method comprising:

forming a tongue section by removing material from the suction side and from the pressure side in an area of the trailing edge, wherein the tongue section is a solid structure integrally extending from the trailing edge of the blade and forms a step at the pressure side and a step at the suction side; and fitting a groove in the rear edge ridge onto the tongue section so that an outer surface of the rear edge ridge is flush with an outer surface of the rotor blade on the suction side and pressure side.

2. The method according to claim 1, wherein the rear edge ridge includes an end section facing away from the groove section, the end section including a plurality of spikes.

3. The method according to claim 1 further comprising fitting a plurality of rear edge ridges along the trailing edge of the rotor blade.

4. The method according to claim 1 further comprising applying an adhesive to at least one of the tongue section and the groove section before fitting the groove in the rear edge ridge onto the tongue section.

5. The method according to claim 1, wherein the rear edge ridge is made of a fiber-reinforced material.

6. The method according to claim 5, wherein the fiber-reinforced material is a fiberglass-reinforced plastic material.

* * * * *